(12) United States Patent
Iwamoto

(10) Patent No.: US 7,694,847 B2
(45) Date of Patent: Apr. 13, 2010

(54) SNAP RING SUPPLYING DEVICE AND METHOD

(75) Inventor: Yuichi Iwamoto, Tokyo (JP)

(73) Assignee: Hirata Corporation, Tokyo (JP)

( * ) Notice: Subject to any disclaimer, the term of this patent is extended or adjusted under 35 U.S.C. 154(b) by 1007 days.

(21) Appl. No.: 10/559,817

(22) PCT Filed: Jul. 23, 2003

(86) PCT No.: PCT/JP03/09301

§ 371 (c)(1),
(2), (4) Date: Dec. 8, 2005

(87) PCT Pub. No.: WO2005/009670

PCT Pub. Date: Feb. 3, 2005

(65) Prior Publication Data

US 2006/0138160 A1    Jun. 29, 2006

(51) Int. Cl.
*B65H 3/00* (2006.01)
*B65H 1/00* (2006.01)
*B65H 1/08* (2006.01)

(52) U.S. Cl. .................. 221/258; 221/297; 221/298; 221/232; 221/299; 221/301; 221/238; 221/239; 221/278; 221/213; 221/226; 221/268

(58) Field of Classification Search .................. 221/258, 221/297, 298, 299, 301, 238, 239, 278, 213, 221/232, 226, 268
See application file for complete search history.

(56) References Cited

U.S. PATENT DOCUMENTS 3,623,635 A * 11/1971 Erdmann ...................... 221/23
3,935,873 A *  2/1976 Johnson ........................ 453/41
5,842,598 A * 12/1998 Tsuchida ...................... 221/258

(Continued)

FOREIGN PATENT DOCUMENTS

JP         51-133899         10/1976

(Continued)

*Primary Examiner*—Gene O. Crawford
*Assistant Examiner*—Rakesh Kumar
(74) *Attorney, Agent, or Firm*—Wenderoth, Lind & Ponack, L.L.P.

(57) ABSTRACT

A snap-ring supplying device includes a magazine (10) containing C-shaped snap rings (S) piled together each of which has a gap, an extrusion member (25) that pushes out a snap ring occupying the lowest position in the magazine so that the gap (S1) of the snap ring is directed forwardly in an extruding direction, a conveying path (23) that conveys the snap ring pushed out by the extrusion member to an area in which the snap ring is contracted to reduce the diameter of the snap ring, a projection-strip guide wall (26) formed to stand upwardly in a substantially vertical direction with a width that is defined by forming a pair of concave parts (28) and that can enter the gap of the snap ring in a termination area of the conveying path, and an oscillating member (31) and urging members (32, 33) serving as a restricting mechanism (30) that restricts the gap of the snap ring so that the gap is directed in a direction from the magazine to the projection-strip guide wall. With this structure, the direction of the gap is restricted during conveyance, and hence the snap ring can be supplied to the ring-contracting area while reliably changing the attitude of the snap ring.

5 Claims, 10 Drawing Sheets

U.S. PATENT DOCUMENTS

| | | | | |
|---|---|---|---|---|
| 5,941,414 | A * | 8/1999 | Kasper | 221/210 |
| 5,950,865 | A * | 9/1999 | Menes | 221/232 |
| 5,971,206 | A * | 10/1999 | Manukyan | 221/232 |
| 6,631,827 | B2 * | 10/2003 | Goodsmith et al. | 221/238 |
| 6,651,841 | B2 * | 11/2003 | Tsuchida | 221/251 |
| 6,971,546 | B2 * | 12/2005 | Costa | 221/297 |
| 7,299,942 | B2 * | 11/2007 | Edens et al. | 221/212 |

FOREIGN PATENT DOCUMENTS

| | | |
|---|---|---|
| JP | 53-14478 | 2/1978 |
| JP | 61-61184 | 4/1986 |
| JP | 2-97529 | 8/1990 |
| JP | 5-20829 | 3/1993 |
| JP | 2000-135634 | 5/2000 |
| JP | 2002-346855 | 12/2002 |

* cited by examiner

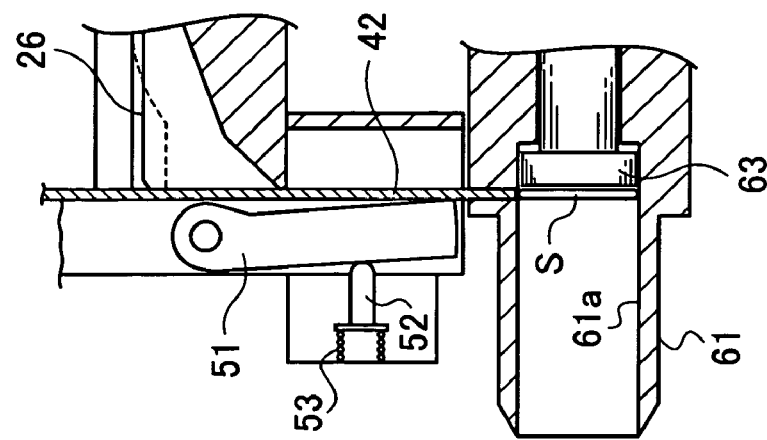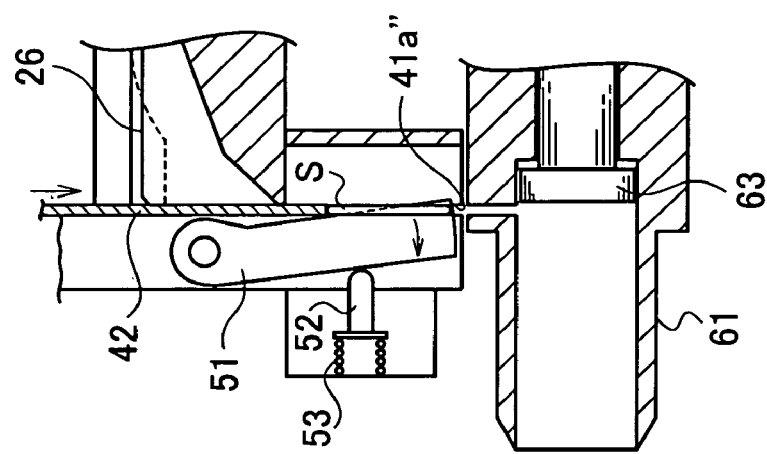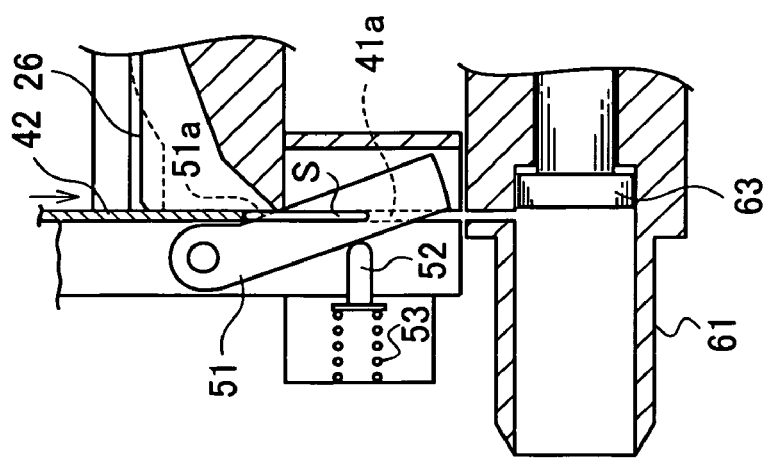

US 7,694,847 B2

SNAP RING SUPPLYING DEVICE AND METHOD

BACKGROUND OF THE INVENTION

1. Technical Field

This invention relates to a snap-ring supplying device and a snap-ring supplying method for, when a C-shaped snap ring having a gap is automatically fitted into an installation groove formed in a workpiece, such as a piston, supplying the snap ring taken out from a magazine to the workpiece while directing the gap of the snap ring in a predetermined direction. More particularly, this invention relates to a snap-ring supplying device that is used in a step of taking out a snap ring from a magazine and supplying the snap ring to an area in which the snap ring is contracted (i.e., in which the diameter of the snap ring is reduced) and that serves as a part of a snap-ring installing apparatus, and relates to a snap-ring supplying method.

2. Description of the Related Art

Various types of snap-ring installing apparatuses or snap-ring supplying devices have been developed. In a piston of an internal combustion engine, the snap-ring installing apparatus or the snap-ring supplying device is used to automatically fit a snap ring, which is used to prevent a piston pin that connects a connecting rod to the piston from falling off, into an annular installation groove formed in the piston.

In the snap-ring installing apparatus, the lowest one of a plurality of snap rings that are piled together and are contained in a magazine is first cut out (taken out) one by one from the magazine, and the snap ring is then contracted to reduce the diameter thereof. Thereafter, the snap ring is pushed into an installation groove of a piston, and is then snapped back to enlarge the diameter thereof by the elastic restoring force of the snap ring, thus completing installation of the snap ring. In this process ranging from the ring-taking-out step to the ring-fitting step, there is a need to regulate the snap ring so as to direct a gap of the snap ring in a predetermined direction and so as not to deviate the position of the gap.

A conventional apparatus is known as an example of the snap-ring installing apparatus that performs the series of operations. In this conventional apparatus, snap rings are pushed out from a magazine one by one by a reciprocating cutting-out plate (extrusion member) so that a gap of the snap ring is directed forwardly with respect to a direction in which the snap ring is pushed out, are then moved along a conveying path, are further moved while changing the attitude of the snap ring so that the gap of the snap ring pushed out therefrom is directed downwardly by the weight of the snap ring when the snap ring reaches a projection-strip guide wall, and are conveyed to an area in which the snap ring is contracted to reduce the diameter thereof (see Japanese Unexamined Patent Publication No. 2002-346855, for example).

However, in this conventional snap-ring installing apparatus, there is a fear that, in the process ranging from the step of cutting out the snap rings from the magazine to the step of conveying the snap rings to the projection-strip guide wall, the direction of the gap of the snap ring will be deviated, and hence clogging and jamming will occur without engaging the gap with the projection-strip guide wall. Additionally, there is a fear that, if a cover plate or the like is provided above the projection-strip guide wall in order to prevent the intrusion of dust or foreign materials, the snap ring conveyed to the projection-strip guide wall will cling to the cover plate by, for example, the magnetization of the cover plate resulting from a time-dependent change or by an adsorbing action of, for example, an oil film adhering to the cover plate, and will be maintained in a horizontal state without changing the attitude of the snap ring so as to direct the gap downwardly, and hence clogging and jamming will occur.

A conventional snap-ring supplying device is also known. In this device, snap rings are pushed out from a magazine one by one by a cutting-out plate (extrusion member) whose end has a projection, and, simultaneously, the projection of the cutting-out plate is fitted into a gap of the snap ring. The snap rings are then moved along a conveying path while directing the gap backwardly, and are conveyed to a step of contracting the snap ring to reduce the diameter thereof by means of a pushing-up rod that can move in upward and downward directions when the snap ring reaches a predetermined position (see Japanese Unexamined Patent Publication No. 2000-135634, for example).

However, in this snap-ring supplying device, since the gap of the snap ring is not under restrictions (since the gap is not directed to prevent the deviation of the position of the gap) before allowing the cutting-out plate to come into contact with the snap ring, there is a fear that the position of the gap will be deviated by shocks or vibrations given from outside. Additionally, if the snap ring is pushed out in a state in which the gap is directed forwardly in the direction in which the snap ring is pushed out, the gap cannot be directed by the projection of the cutting-out plate situated backwardly, and hence the same problem as in the conventional snap-ring installing apparatus mentioned above will arise.

The present invention has been made in consideration of the foregoing circumstances. It is therefore an object of the present invention to provide a snap-ring supplying device and a snap-ring supplying method capable of, in a simple structure, reliably directing a gap of a snap ring and stably supplying snap rings to fit the snap rings when the whole process ranging from a step of supplying the snap rings to a step of fitting the snap rings is automatically performed.

SUMMARY OF THE INVENTION

The snap-ring supplying device of the present invention that achieves the object includes a magazine containing C-shaped snap rings piled together each of which has a gap, an extrusion member that pushes out a snap ring occupying a lowest position in the magazine so that the gap of the snap ring is directed forwardly in an extruding direction, a conveying path that conveys the snap ring pushed out by the extrusion member to an area in which the snap ring is contracted to reduce the diameter of the snap ring, a projection-strip guide wall formed to stand upwardly in a substantially vertical direction with a width with which the projection-strip guide wall can enter the gap of the snap ring in a termination area of the conveying path, and a restricting mechanism that restricts the gap of the snap ring so that the gap is directed in a direction from the magazine to the projection-strip guide wall.

According to this structure, the restricting mechanism directs the gap in a direction in the process in which the extrusion member pushes out a snap ring occupying the lowest position in the magazine and conveys the snap ring along the conveying path to the projection-strip guide wall. Therefore, when the snap ring reaches the projection-strip guide wall, the projection-strip guide wall reliably enters the gap, and the snap ring can be supplied to the ring-contracting area while reliably changing the attitude of the snap ring.

In the device structured as above, the restricting mechanism may include an oscillating member having a long guide part that is protractible and retractable with respect to a conveying surface of the conveying path and that has a width that can enter the gap, and an urging member that urges the oscillating member so that the guide part protrudes from the conveying surface.

According to this structure, the restricting mechanism is formed of simple components, such as the oscillating member and the urging member, and hence the structure can be made simple, and the gap can be reliably directed.

In the device structured as above, the guide part of the oscillating member may be formed to enter the gap of the snap ring occupying the lowest position in the magazine in a standby state in which the snap ring has not yet been pushed out.

According to this structure, also in the state in which the snap ring has not yet been pushed out, the snap ring is restricted by the guide part of the oscillating member so that the gap is not deviated. Therefore, even when the device receives shocks or vibrations from outside, the gap can be reliably prevented from being deviated.

In the device structured as above, the device may further include a cover member disposed above the projection-strip guide wall. The cover member has a guide part formed to guide the gap of the snap ring downwardly so as to direct the gap of the snap ring conveyed by the extrusion member toward the projection-strip guide wall.

According to this structure, the cover member can prevent dust or foreign materials from entering the conveying path. Additionally, even when the cover member is magnetized or even when an oil film or the like adheres to the lower surface of the cover member, the snap ring is guided downwardly by the guide part of the cover member, and is forcibly separated therefrom. Therefore, the snap ring can be prevented from adhering to the lower surface of the cover member.

In the device structured as above, the guide part of the cover member may consist of a pair of guide parts formed to protrude from the lower surface thereof at positions symmetrical with respect to the projection-strip guide wall.

According to this structure, areas around the two positions between which the gap of the snap ring is present are depressed symmetrically by the pair of guide parts, and hence the snap ring can reliably undergo a downward attitude change without being inclined.

In the device structured as above, each of the pair of guide parts may have a contact surface that is curved so that a projection amount from the lower surface increases in a curve so as to come into contact with the snap ring.

According to this structure, the snap ring is guided gradually downwardly by the curved contact surface, and hence sticking or catching can be prevented from occurring between the snap ring and the guide part, and an attitude change can be smoothly performed.

The snap-ring supplying method of the present invention that achieves the object includes an extrusion step of pushing out a snap ring in a substantially horizontal direction, the snap ring being one of a plurality of C-shaped snap rings piled together at a predetermined location and occupying a lowest position in the snap rings piled together; and an attitude changing step of changing an attitude of the snap ring so that a gap of the snap ring is directed substantially downwardly in a vertical direction in a termination area in the extrusion step and supplying the snap ring to an area in which the snap ring is contracted to reduce a diameter of the snap ring. In the extrusion step, the snap ring is pushed out while directing the gap forwardly in an extruding direction.

According to this structure, when the snap ring is pushed out, then undergoes an attitude change, and is conveyed to the ring-contracting area, the gap is always directed forwardly in the extruding direction. Therefore, the snap ring can be supplied to the ring-contracting area while reliably undergoing an attitude change.

In the method structured as above, the gap may be directed by allowing a guide part protractible and retractable in a substantially vertical direction to enter the gap.

According to this structure, the position of the guide part that enters the gap can be easily altered in accordance with the movement of the gap by extruding the snap ring.

In the method structured as above, in the attitude changing step, the gap of the snap ring pushed out may be forcibly directed downwardly.

According to this structure, when the snap ring undergoes an attitude change, a compelling force, in addition to its own weight, is exerted onto the snap ring, and hence the attitude change is reliably performed.

BRIEF DESCRIPTION OF THE DRAWINGS

FIG. 10A, FIG. 10B, and FIG. 10C are sectional side views showing operations of the device in a snap-ring-contracting step.

DETAILED DESCRIPTION OF THE INVENTION

Figure 1:
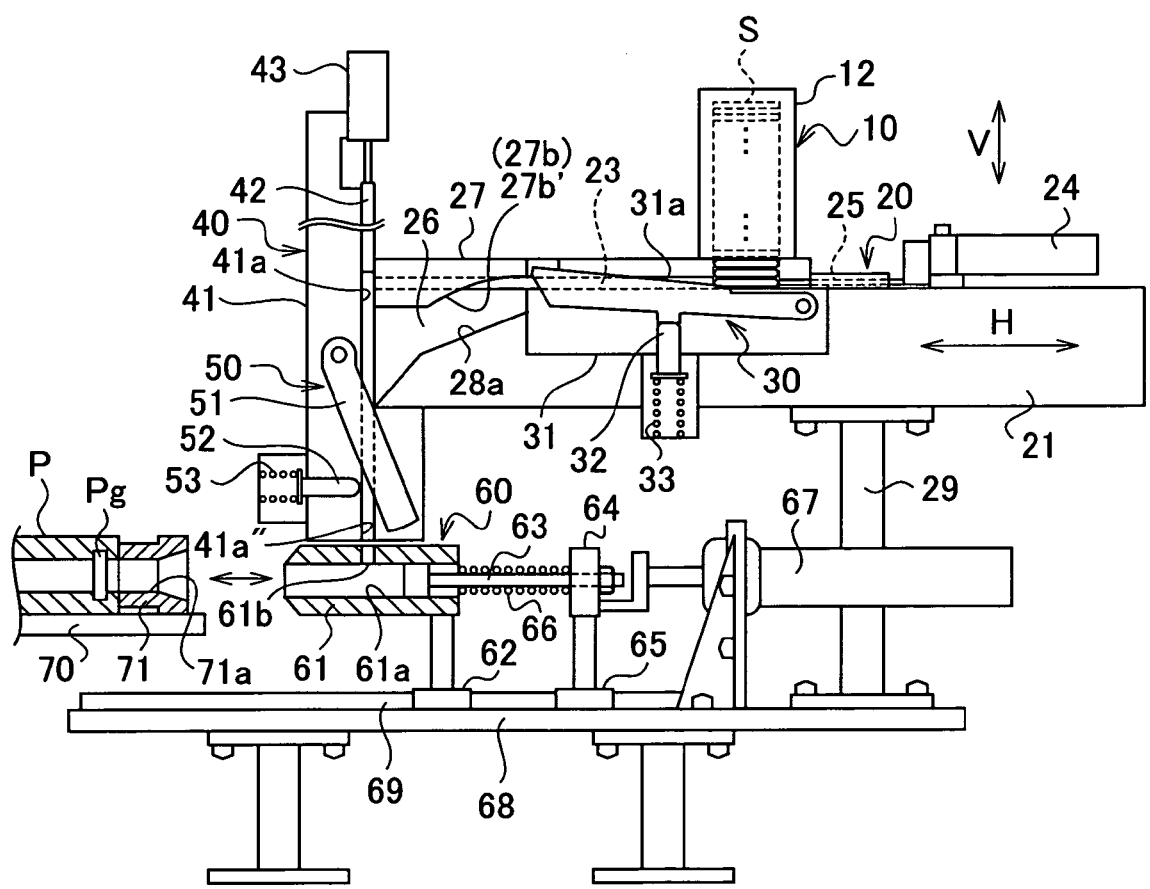
FIG. 1 is a side view showing an embodiment of a snap-ring installing apparatus provided with a snap-ring supplying device according to the present invention.

An embodiment of a snap-ring supplying device according to the present invention will be hereinafter described with reference to the accompanying drawings. FIG. 1 shows a snap-ring installing apparatus provided with the snap-ring supplying device according to the present invention.

As shown in FIG. 1, the snap-ring installing apparatus includes a magazine 10 that contains C-shaped snap rings S piled together in a vertical direction V each of which has a gap S1, a conveying mechanism 20 that pushes out and conveys the snap rings S in a horizontal direction H, a restricting mechanism 30 that is provided in the conveying mechanism 20 and restricts the direction of the gap S1, a diameter reduction mechanism 40 that contracts the snap ring S, whose attitude has been changed in the vertical direction V, so as to reduce the diameter of the snap ring S, a restricting mechanism 50 that is provided in the diameter reduction mechanism 40 and restricts the direction of the gap S1, and an inserting mechanism 60 that inserts the snap ring S contracted by the diameter reduction mechanism 40 into an installation groove Pg of a piston P that is a workpiece. Herein, the magazine 10, the conveying mechanism 20, the restricting mechanism 30, etc., constitute the snap-ring supplying device.

Figure 2:
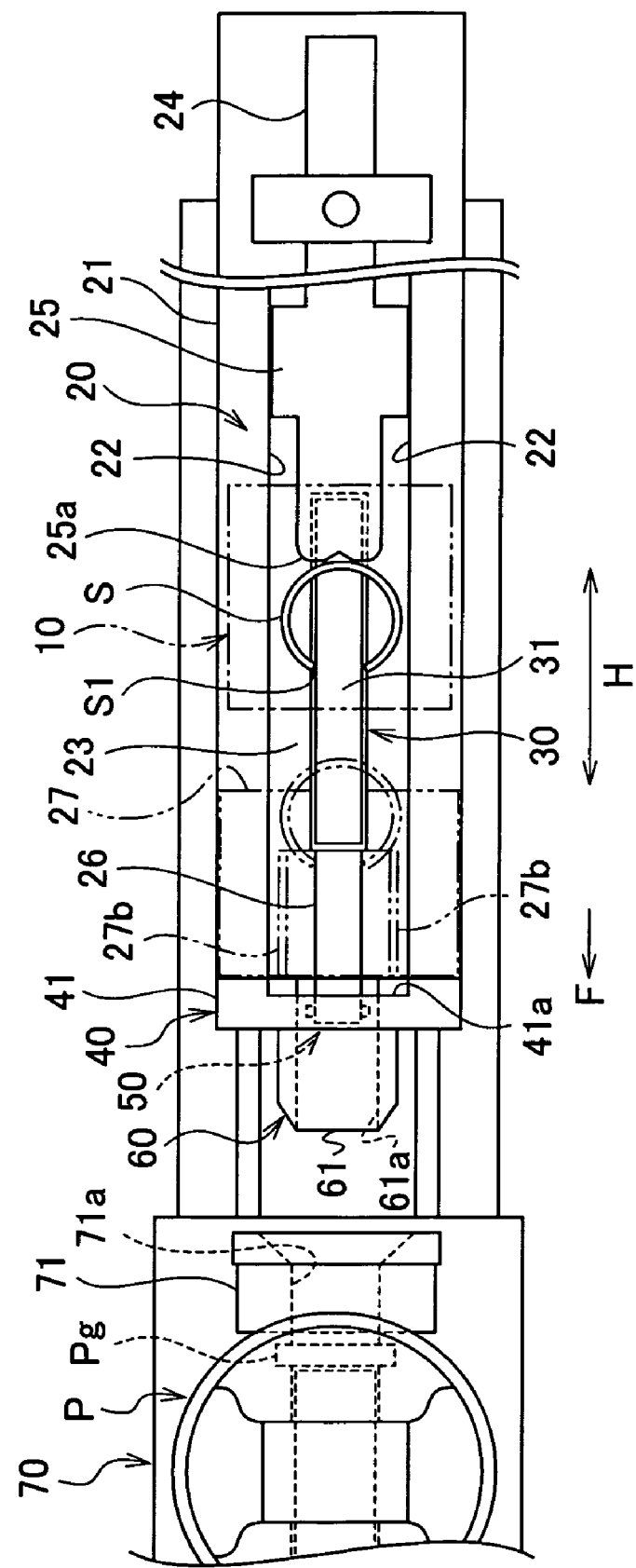
FIG. 2 is a plan view of the snap-ring installing apparatus of FIG. 1.
Figure 3:
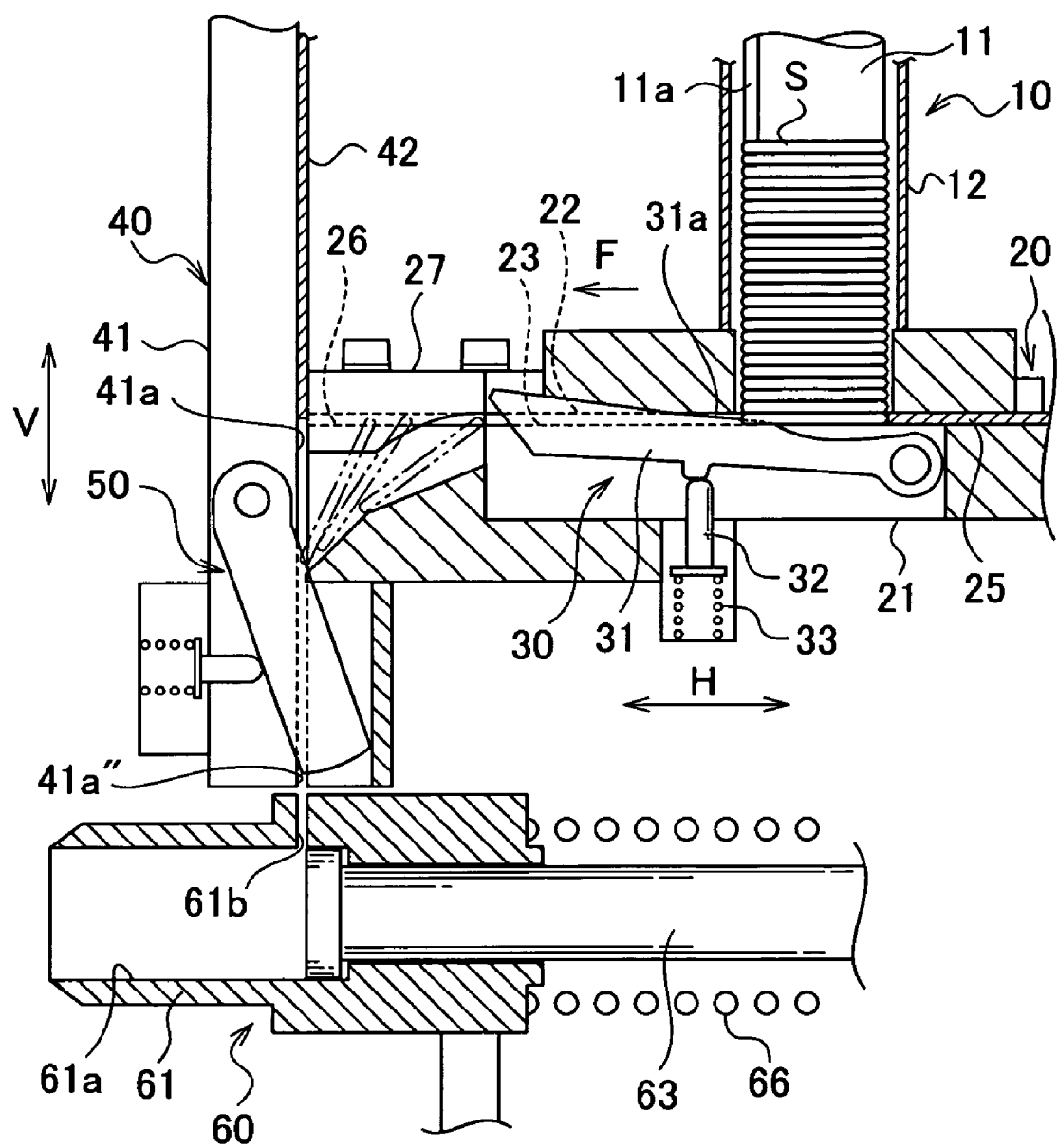
FIG. 3 is a side view showing a part of the apparatus of FIG. 1.

As shown in FIGS. 1 to 3, the magazine 10 is provided above the conveying mechanism 20, and is formed of a substantially cylindrical guide shaft 11 extending in the vertical direction V, a cover 12 with which the periphery of the guide shaft 11 is covered, etc. The guide shaft 11 holds snap rings S piled together on the outer peripheral surface thereof so that the snap ring can fall down by its own weight, and has a projection part 11a by which a gap S1 of the snap ring is directed toward the front F in a direction in which the snap ring is pushed out (i.e., in a conveying direction H). A snap ring S occupying the lowest position in the magazine 10 is disengaged from the guide shaft 11, and is held on a conveying path 23 described later.

The conveying mechanism 20 conveys the snap rings S contained in the magazine 10 while changing the attitude of the snap ring S from the horizontal direction H to the substantially vertical direction V when conveyed to the diameter reduction mechanism 40 (i.e., to the ring-contracting area). As shown in FIGS. 1 to 3, the conveying mechanism 20 is made up of the conveying path 23 that is defined by a guide 22 formed on the upper surface of a conveying base 21 and that extends in the horizontal direction H, a flat extrusion member 25 that is slid and reciprocated on the conveying path 23 by means of a pressure cylinder 24 disposed on the side of an end of the conveying base 21, a projection-strip guide wall 26 formed in a termination area of the conveying path 23, and a cover member 27 disposed to cover the upper side of the projection-strip guide wall 26.

The extrusion member 25 pushes out the snap ring S occupying the lowest position of the magazine 10 one by one in such a way as to come into contact with the snap ring S from behind so that the gap S1 of the snap ring S is directed toward the front F in the extruding direction H, and conveys the snap ring S to the terminal of the conveying path 23.

Figure 5:
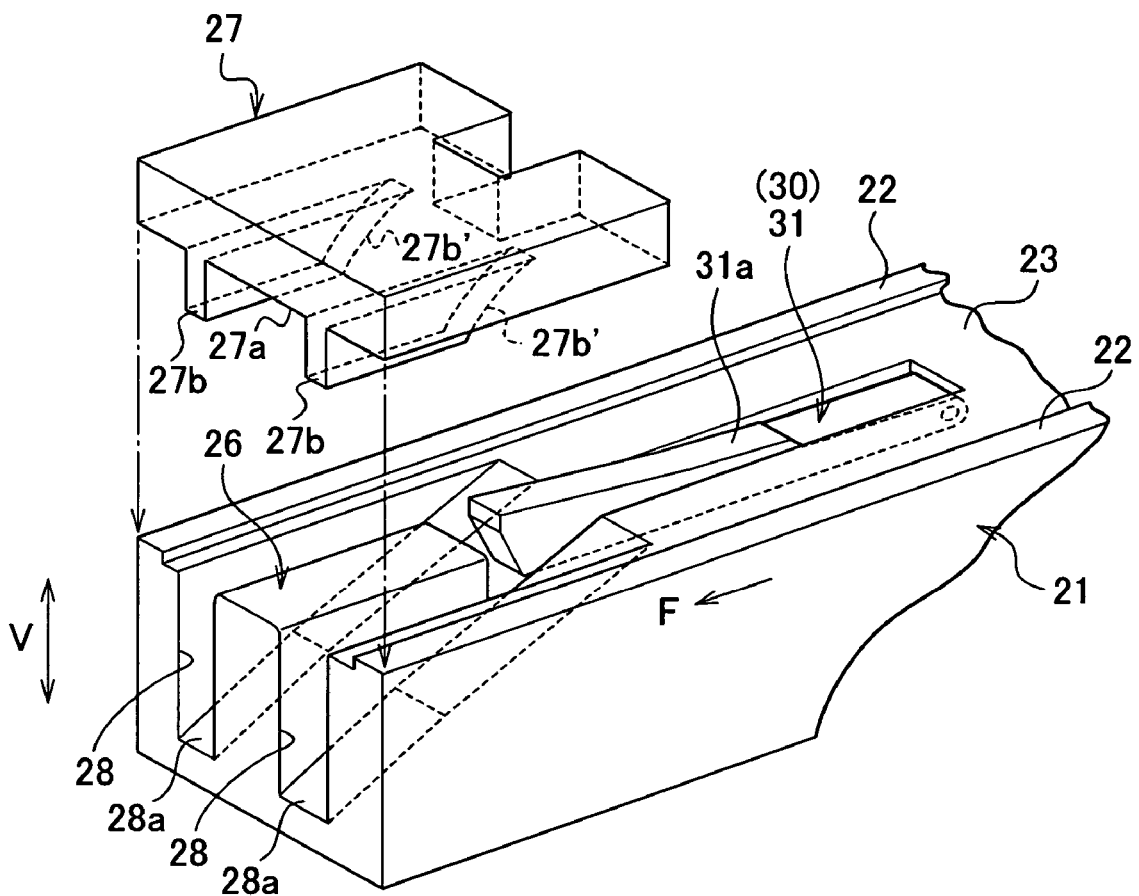
FIG. 5 is a partially exploded perspective view showing a conveying path, a projection-strip guide wall, the oscillating member, and a cover member that are components of the snap-ring supplying device.

As shown in FIGS. 1, 2, and 5, the projection-strip guide wall 26 is defined to extend in the center of the conveying path 23 by forming a pair of concave parts 28 in the termination area of the conveying path 23, and is formed to stand upwardly in the substantially vertical direction V with a width that can enter the gap S1. The bottom 28a of each concave part 28 is formed to be an inclined surface that descends toward the front F, and allows the snap ring S to change the attitude of the snap ring S from the horizontal direction H to the vertical direction V.

As shown in FIGS. 1 to 3 and FIG. 5, the cover member 27 is fixed to the conveying base 21 in such a way as to cover the upper side of the projection-strip guide wall 26. The cover member 27 has a pair of guide parts 27b protruding from the lower surface 27a of the cover member 27 at positions symmetrical with respect to the projection-strip guide wall 26. Each guide part 27b has a contact surface 27b' that is curved so that a projection amount protruding from the lower surface 27a increases in a curve toward the front F. The contact surface 27b' comes into contact with a snap ring S conveyed by the extrusion member 25 and guides the snap ring S gradually downwardly.

In other words, the cover member 27 can prevent dust or foreign materials from entering the conveying path 23. Even if the snap ring S is liable to adhere to the lower surface 27a of the cover member 27 by the magnetization of the cover member 27 or by other causes (e.g., by an adsorbing action of an oil film adhering thereto), the snap ring S is guided downwardly by the guide part 27b (i.e., by the contact surface 27b'), and is forcibly separated from the lower surface 27a, and is thereby prevented from adhering thereto.

Especially since the cover member 27 has the pair of guide parts 27b, two parts of the snap ring S between which the gap S1 is present are symmetrically depressed by the pair of guide parts 27b (i.e., by the contact surface 27b'). Therefore, the snap ring S reliably undergoes a downward attitude change without being inclined. Additionally, since the guide part 27b has the curved contact surface 27b', the snap ring S is guided gradually downwardly, and undergoes a smooth attitude change without causing sticking or catching between the snap ring S and the guide part 27.

As shown in FIGS. 1 to 5, from the magazine 10 to the projection-strip guide wall 26, the restricting mechanism 30 restricts the snap ring S so that the gap S1 of the snap ring S is directed toward the front F without being deviated. The restricting mechanism 30 is disposed on the conveying base 21, and is made up of an oscillating member 31 that is protractible and retractable with respect to the conveying path 23, a rod 32 and a compression spring 33 serving as an urging member that urges the oscillating member 31 upwardly so that the oscillating member 31 protrudes from a conveying surface 23.

Figure 4A:
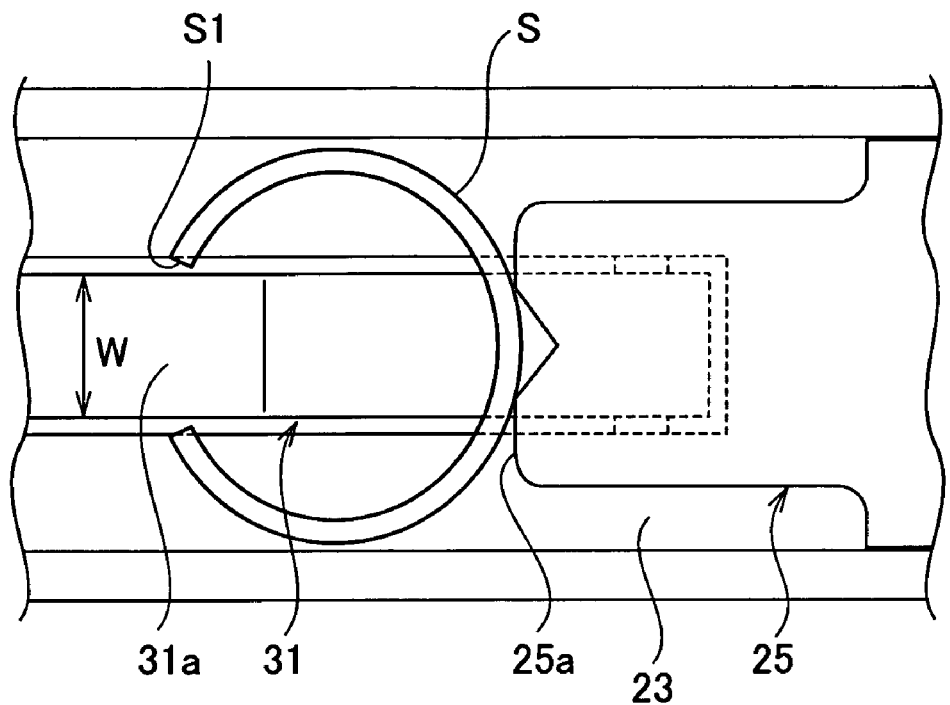
FIG. 4A is a plan view showing a relationship between an oscillating member serving as a component of the snap-ring supplying device and a snap ring occupying the lowest position of a magazine.
Figure 4B:
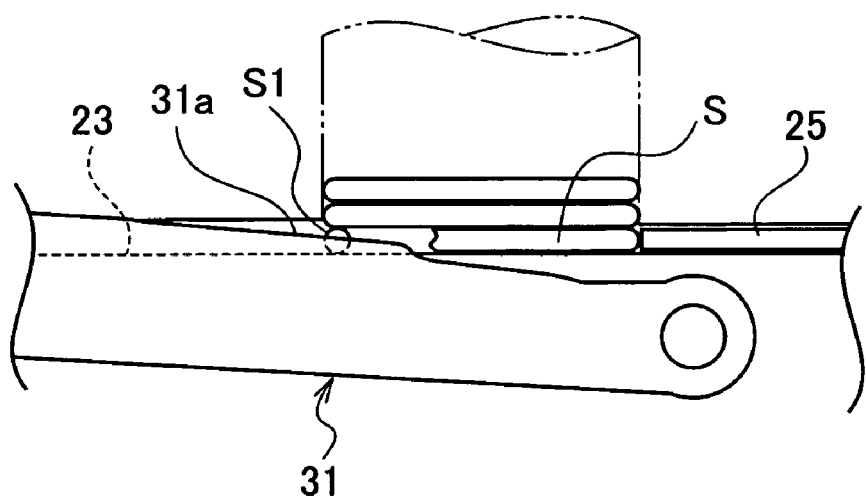
FIG. 4B is a side view showing a relationship between the oscillating member and the snap ring occupying the lowest position of the magazine.

As shown in FIGS. 4A and 4B, the oscillating member 31 has a long guide part 31a having a width W that allows the guide part 31a to enter the gap S1. As shown in FIG. 4B, even in a state before being pushed out by the extrusion member 25, the guide part 31a can enter the gap S1 of the snap ring S occupying the lowest position of the magazine 10. Therefore, the gap S1 is reliably prevented from being deviated even if the device receives shocks or vibrations from outside in a stand-by state in which the snap ring S has not yet been pushed out.

Additionally, the oscillating member 31 is protractible and retractable with respect to the conveying surface 23, and the end part 25a of the extrusion member 25 moves while pushing the oscillating member 31 downwardly when the extrusion member 25 moves toward the front F in the process in which the snap ring S is pushed out by the extrusion member 25 and is conveyed along the conveying path 23. Therefore, the position of the guide part 31a entering the gap S1 varies from the backward area toward the forward area thereof, and acts to always restrict the gap S1.

As shown in FIGS. 1 to 3 and FIGS. 6A and 6B, the diameter reduction mechanism 40 is contiguous to the terminal of the conveying path 21 (the projection-strip guide wall 26), and is made up of a diameter reduction guide 41 that extends in the vertical direction V and that defines a diameter reduction guide path 41a, a flat pressing member 42 supported reciprocatively in the vertical direction V in the diameter reduction guide path 41a, and a pressure cylinder 43 that drives the pressing member 42.

Figure 6A:
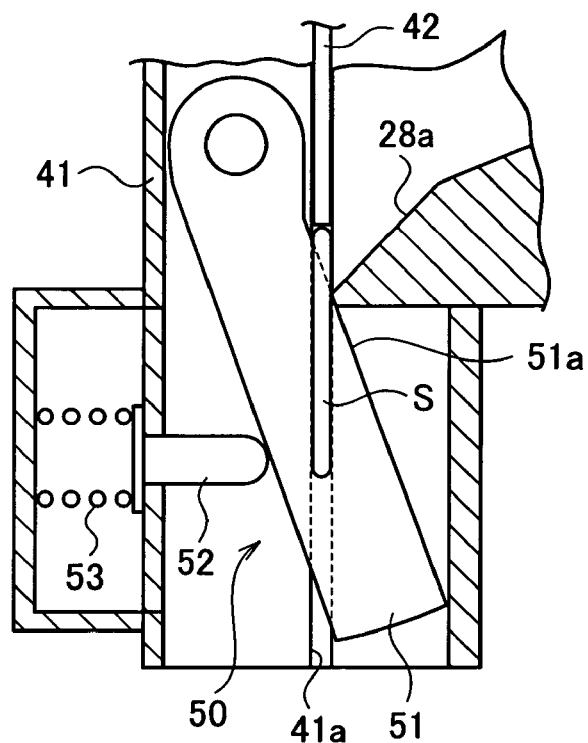
FIG. 6A is a sectional side view of a diameter reduction area (i.e., ring-contracting area) of the snap-ring installing apparatus.
Figure 6B:
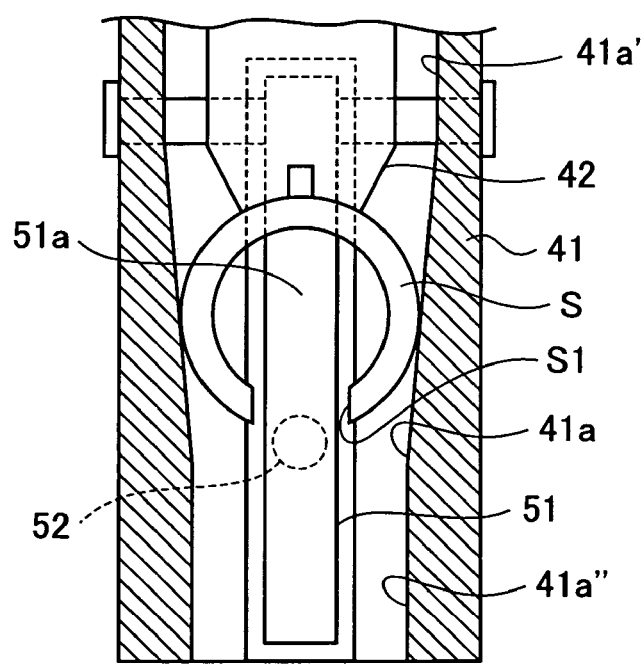
FIG. 6B is a sectional view of the diameter reduction area when the snap-ring installing apparatus is seen from the backface thereof.

The diameter reduction guide path 41a is slightly greater than the thickness of the snap ring S, and, as shown in FIG. 6B, the width of the guide path 41a becomes smaller from an upper opening 41a', which is wider than the outer diameter of the snap ring S, toward a lower opening 41a", which is narrower than the outer diameter of the snap ring S, i.e., from the upper side toward the lower side.

As shown in FIGS. 1, 3, 6A, and 6B, the restricting mechanism 50 is provided in the diameter reduction mechanism 40 and directs the gap S1 of the snap ring S, which has undergone an attitude change in the vertical direction V, downwardly. The restricting mechanism 50 is made up of an oscillating plate 51 that is swingable in the diameter reduction guide 41, a rod 52 and a compression spring 53 that urge the oscillating plate 51 toward the inside of the diameter reduction guide path 41a.

The oscillating plate 51 is protractible and retractable with respect to the diameter reduction guide path 41a, and hence, in the process in which the snap ring S is depressed by the pressing member 42 and is moved while being contracted to reduce the diameter thereof inside the diameter reduction guide path 41a, the oscillating plate 51 is moved backward against the urging force of the compression spring 53, and simultaneously, the upper edge 51a always enters the gap S1 thereby preventing the deviation of the gap S1 directed downwardly.

As shown in FIGS. 1 and 3, the inserting mechanism 60 is made up of an insertion cylinder 61 that holds contracted snap rings S, a slider 62 that supports the insertion cylinder 61 reciprocatively in the horizontal direction H, an insertion shaft 63 reciprocatively fitted into the path 61a of the insertion cylinder 61, a fixing member 64 fixing the insertion shaft 63, a slider 65 that supports the fixing member 64 reciprocatively in the horizontal direction H, a coil spring 66 that exerts an urging force in a direction in which the insertion cylinder 61 and the fixing member 64 recede from each other when the coil spring 66 having both ends hooked on the insertion cylinder 61 and the fixing member 64, respectively, is compressed and that exerts an urging force in a direction in which the insertion cylinder 61 and the fixing member 64 approach each other when the coil spring 66 is stretched, a pressure cylinder 67 that drives the fixing member 64 in the horizontal direction H, a base 68, and a guide rail 69 provided on the base 68 for guiding the sliders 62 and 65. The conveying base 21 is fixed to the base 68 with a supporting rod 29 therebetween.

The insertion cylinder 61 is formed movably in the horizontal direction H independently of the diameter reduction guide 41 with a slight gap between the lower end of the reduction guide 41 and the insertion cylinder 61. As shown in FIGS. 1 and 3, the insertion cylinder 61 has an opening 61b having the same width as the lower opening 41a″ of the diameter reduction guide path 41a so as to become contiguous to the lower opening 41a″.

A table 70 that sequentially positions the piston P is disposed facing the insertion cylinder 61. The piston P is positioned next to a jig 71 fastened to the table 70, and is fixed there. In more detail, when the end part of the insertion cylinder 61 is fitted into an opening of the jig 71, a path in which the path 61a of the insertion cylinder 61 and a path 71a of the jig 71 are contiguously connected together is created, and the snap ring S, which is contracted to reduce the diameter thereof, is pushed by the insertion shaft 63, is then moved inside the paths 61a and 71a, and is inserted into the installation groove Pg of the piston P.

Figure 7A:
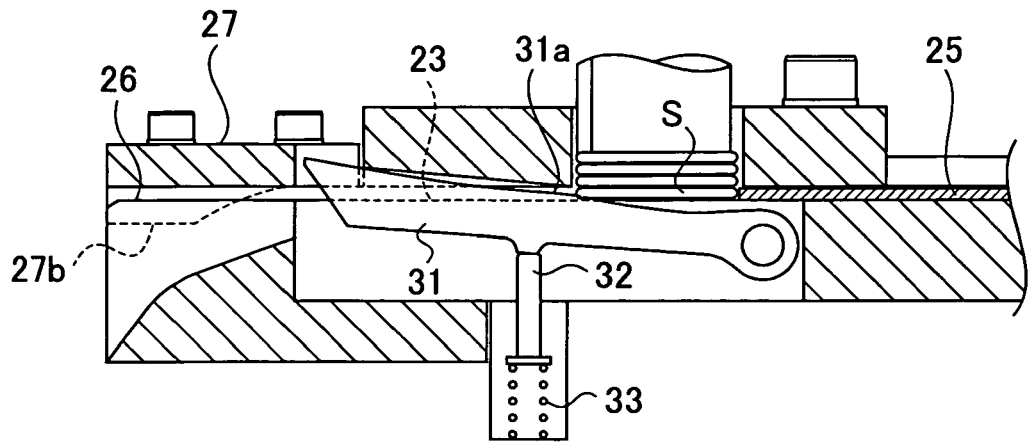
FIG. 7A, FIG. 7B, and FIG. 7C are sectional side views showing operations of the device in a snap-ring extruding step.

Next, the operations of this device will be described with reference to FIGS. 7A to 7C, FIGS. 8A to 8C, FIGS. 9A and 9B, and FIGS. 10A to 10C. First, when the extrusion member 25 is at the rear stand-by position, the guide part 31a of the oscillating member 31 enters the gap S1 as shown in FIG. 7A, and the gap S1 is restricted so as not to deviate from the state of being directed toward the front F in the extruding direction H.

Figure 7B:
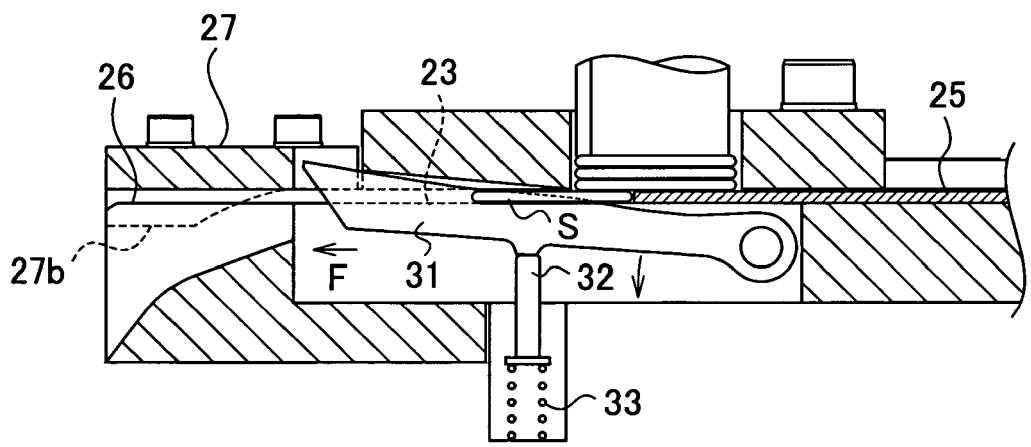
Figure 7C:
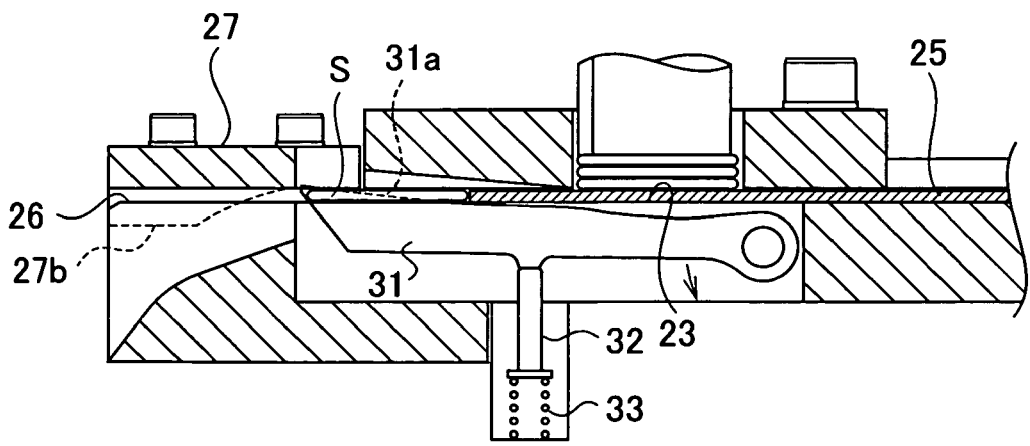

When the pressure cylinder 24 is driven in the stand-by state, the extrusion member 25 starts moving toward the front F as shown in FIG. 7B, and a snap ring S occupying the lowest position in the magazine 10 is pushed out. The snap ring S is moved toward the front F along the conveying path 23 while being pushed by the extrusion member 25, and the gap S1 of the snap ring S reaches a start area of the projection-strip guide wall 26 as shown in FIG. 7C (extrusion step).

Figure 9A:
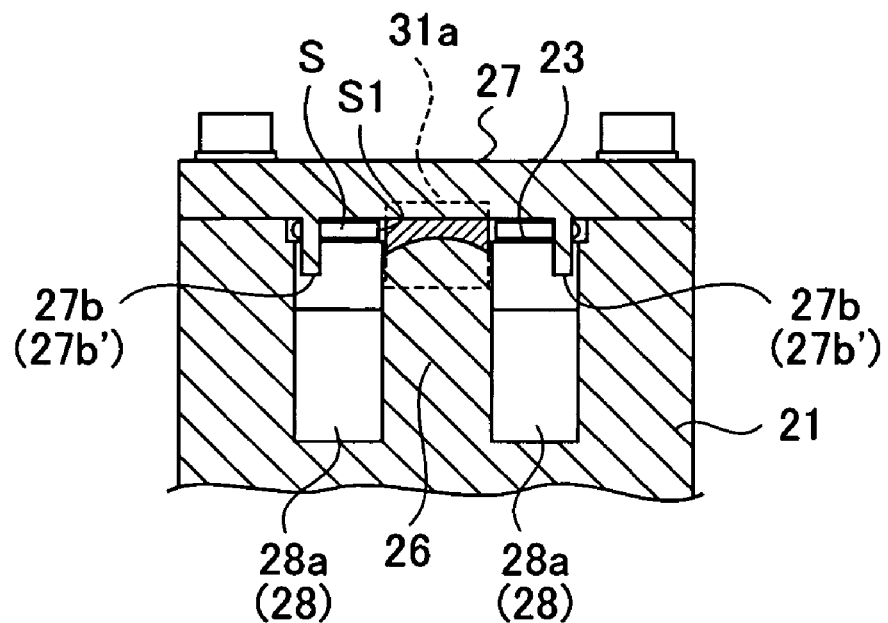
FIG. 9A is a partial sectional view of the device when seen from the front in a conveying direction in the snap-ring extruding step.

In this step, the oscillating member 31 is depressed by the extrusion member 25, and the guide part 31a of the oscillating member 31 always enters the gap S1 of the snap ring S as shown in FIG. 9A, thereby restricting the direction of the gap S1. Therefore, the snap ring S being conveyed therealong never causes a positional deviation, and the gap S1 is directed toward the projection-strip guide wall 26.

Figure 8A:
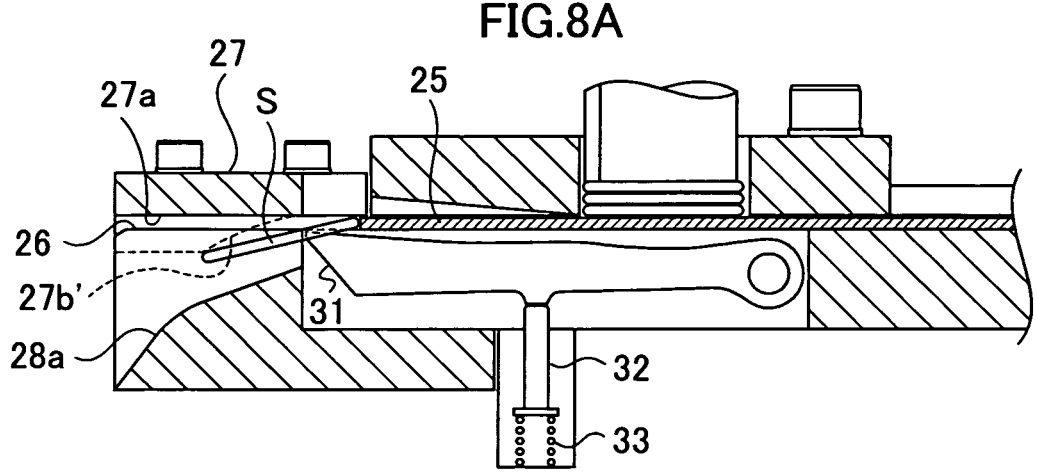
FIG. 8A, FIG. 8B, and FIG. 8C are sectional side views showing operations of the device in the snap-ring extruding step and in an attitude changing step.
Figure 8B:
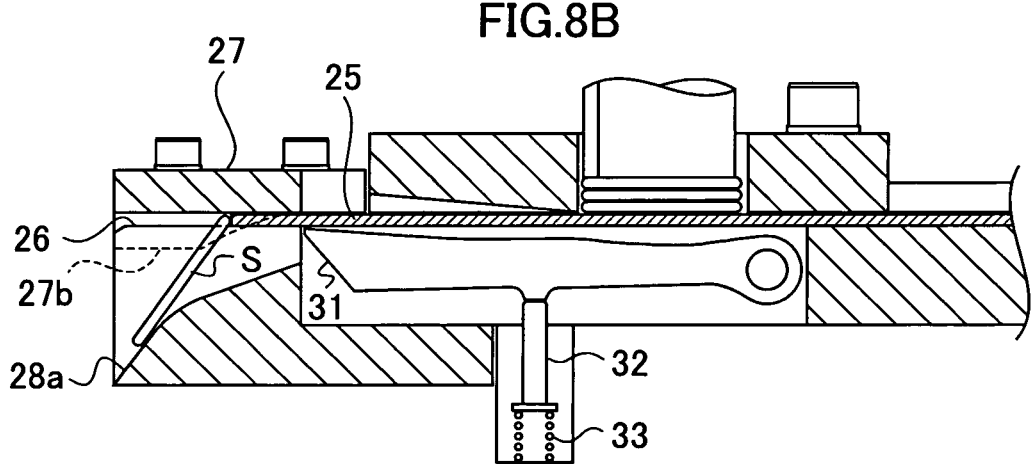
Figure 8C:
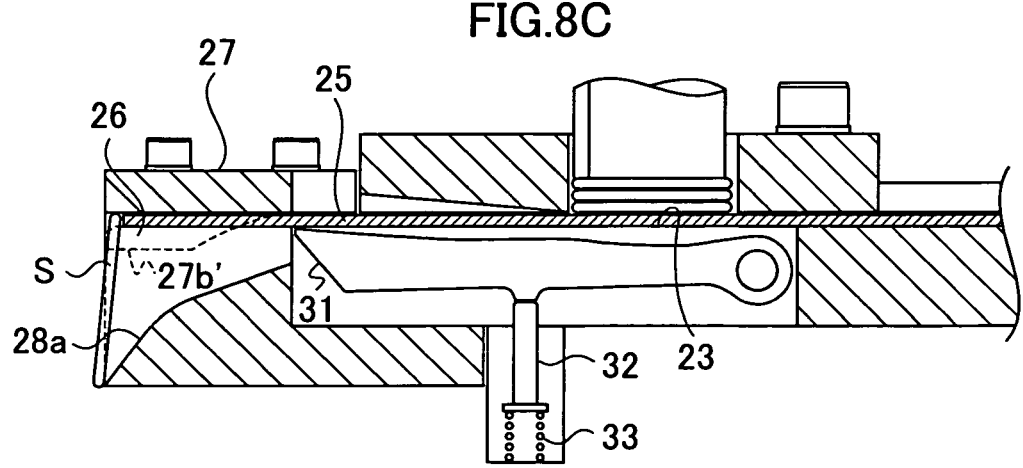
Figure 9B:
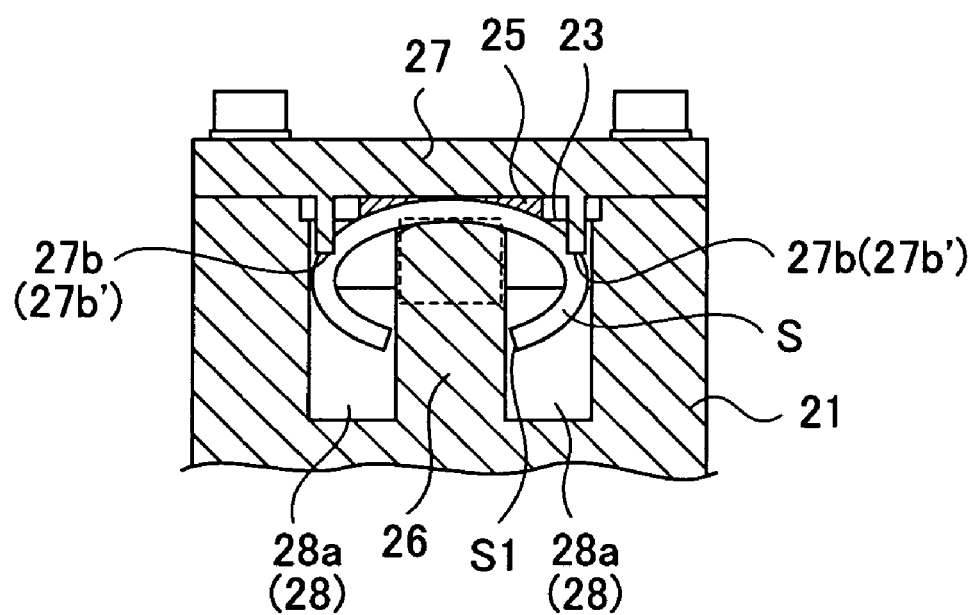
FIG. 9B is a partial sectional view of the device when seen from the front in the conveying direction in the attitude changing step.

When the extrusion member 25 further moves forwardly, the snap ring S is guided to the guide part 27b (the contact surface 27b′) of the cover member 27 as shown in FIG. 8A, and undergoes a gradual, downward attitude change. The snap ring S is further pushed toward the front F as shown in FIG. 8B while the gap S1 of the snap ring S is engaged with the projection-strip guide wall 26 as shown in FIG. 9B. When the snap ring S reaches the terminal end of the conveying path 23 (the terminal of the projection-strip guide wall 26), the snap ring S reaches a state in which the attitude of the snap ring S has been changed in the substantially vertical direction V as shown in FIG. 8C (attitude changing step). At this time, since the snap ring S is moved toward the terminal end while bringing the lower end thereof into contact with the inclined surface 28a, the attitude change from the horizontal direction H to the vertical direction V is smoothly carried out.

When the extrusion member 25 moves the snap ring S to the terminal end of the conveying path 23 (the projection-strip guide wall 26), the snap ring S completely changes its attitude in the vertical direction V, and is conveyed to the diameter reduction guide path 41a (i.e., to the ring-contracting area), so that the gap S1 of the snap ring S is engaged with the upper edge 51a of the oscillating plate 51. The extrusion member 25 is then caused to recede therefrom, and, simultaneously, the oscillating member 30 is pushed back to protrude by the urging force of the compression spring 33, and reaches the stand-by state shown in FIG. 7A, where the direction of the gap S1 of a snap ring S to be pushed out is restricted.

On the other hand, when the snap ring S reaches the upper opening 41a′ of the diameter reduction guide path 41a, the pressure cylinder 43 is driven, and the pressing member 42 moves down to start contracting the snap ring S as shown in FIG. 10A. At this time, the upper edge 51a of the restricting plate 51 has already entered the gap S1 of the snap ring S, and has restricted the positional deviation of the gap S1. Therefore, the snap ring S is smoothly moved down along the diameter reduction guide path 41a by the depressing operation of the pressing member 42, and is contracted as shown in FIG. 10B while restricting the gap S1 in the downward direction.

In this ring-contracting step, the oscillating plate 51 is pushed out in the direction receding from the diameter reduction guide path 41a against the urging force of the compression spring 53 while restricting the direction of the gap S1 by means of the upper edge 51a.

When the pressing member 42 moves to the lowest position as shown in FIG. 10C, the snap ring S enters the path 61a of the insertion cylinder 61 in a state of being contracted to have a predetermined diameter. The snap ring S is then held in the path 61a in a state of being slightly expanded, and the ring-contracting operation is finished The pressure cylinder 43 is then driven, and the pressing member 42 moves up toward the stand-by position. Simultaneously, the pressure cylinder 67 is driven, and the fixing member 65 moves leftwardly in FIG. 1. As a result, the insertion cylinder 61 is also pushed and moved leftwardly by the urging force of the coil spring 66.

When the end part of the insertion cylinder 61 is fitted into the opening of the jig 71, movement of the insertion cylinder 61 is stopped. Thereafter, when the pressure cylinder 67 is further driven, the insertion shaft 63 moves leftwardly inside the path 61a against the urging force of the coil spring 66, so that the snap ring S being in a contracted state is pushed out, and is inserted into the installation groove Pg of the piston P. As a result, the snap ring S is expanded as a result of its own elastic restoring force, and is completely fitted in the installation groove Pg, thus completing the installation of the snap ring S.

Thereafter, when the pressure cylinder 67 is driven in the opposite direction, the fixing member 65 (i.e., the insertion shaft 63) first starts moving rightwardly, and the insertion cylinder 61 also moves rightwardly while being drawn by the urging force of the coil spring 66. As a result, the insertion cylinder 61 is separated from the jig 71, and returns to the stand-by position. Thereafter, the piston P to which the snap ring S has been fitted is conveyed to another step, and a new piston P is set on the table 70.

As described above, when the series of operations are performed, i.e., when the extrusion and conveyance in the horizontal direction of the snap ring S, the attitude change from the horizontal direction to the vertical direction of the snap ring S, the contraction of the snap ring S, and the insertion of the snap ring S are serially performed, the restricting mechanism 30 restricts the direction of the gap S1 without positional deviation in the step from the magazine 10 to the projection-strip guide wall 26 of the conveying path 23, whereas the restricting mechanism 50 restricts the direction of the gap S1 in the ring-contracting step. Therefore, the attitude changing operation and the ring contracting operation are reliably performed.

In the foregoing embodiment, the oscillating member 31, the rod 32, the compression spring 33, etc., are used for the restricting mechanism 30. However, without being limited to this, another mechanism may be used if the direction of the gap S1 can be restricted without causing the deviation thereof.

Additionally, in the foregoing embodiment, a structure made up of the extrusion member 25 and the pressure cylinder 24 that slide on the conveying path 23 is used as the conveying mechanism 20. However, without being limited to this, another structure may be used if a snap ring S occupying the lowest position in the magazine 10 can be pushed out so that the gap S1 thereof is directed forwardly in the extruding direction, and can be conveyed to an area in which the snap ring S is contracted to reduce the diameter thereof.

Additionally, in the foregoing embodiment, a structure is shown in which the conveying path 23 is horizontally formed and in which the diameter reduction guide path 41a is vertically formed. However, they are not necessarily required to be horizontal or vertical. If the snap ring S (the gap S1) can be reliably directed and can be conveyed to the ring-contracting area, a structure in which the conveying path or the diameter reduction guide path is slightly inclined is also included in the scope of the present invention.

As described above, according to the snap-ring supplying device of the present invention, when a snap ring occupying the lowest position in the magazine is pushed out and is conveyed to the projection-strip guide wall in which the attitude of the snap ring is changed, a restricting mechanism is used to restrict the direction of the gap of the snap ring so as to direct the gap forwardly in the conveying direction. Therefore, the attitude of the snap ring is reliably changed while engaging the gap of the snap ring with the projection-strip guide wall, and the snap ring can be supplied to the area in which the snap ring is contracted to reduce the diameter thereof.

As described above, the snap-ring supplying device and the snap-ring supplying method of the present invention can direct a snap ring with high accuracy when the snap ring is fitted to prevent a piston pin that connects a connecting rod to a piston of an internal combustion engine from falling off. Therefore, the device and the method of the present invention are useful in, for example, an automatic installing line to automatically install a snap ring.

What is claimed is:

1. A device for supplying snap rings, the device comprising:
    a magazine for containing C-shaped snap rings piled together, each of the snap rings being held in the magazine such that the gap is directed forward in a conveying direction;
    a conveying base having a conveying path on a surface thereof, the magazine being provided on the conveying base;
    an extrusion member that pushes out a snap ring occupying a lowest position in the magazine forward in the conveying direction along the conveying path;
    an oscillating member that is protractible and retractable with respect to a conveying surface of the conveying path at an area in front of the magazine in the conveying direction, the oscillating member being capable of entering the gap of the snap ring being pushed out so as to direct the gap forward in the conveying direction;
    a projection-strip guide wall that is defined between a pair of concave parts extending in the conveying direction in a termination area of the conveying path of the conveying base, the projection-strip guide wall being formed so as to stand upwardly in the substantially vertical direction, wherein the projection-strip guide wall has a width that permits the projection-strip guide wall to enter the gap of the snap ring; and
    a cover member provided on the conveying base in the termination area of the conveying path so as to cover the pair of concave parts and the projection-strip guide wall from above, wherein:
    the cover member has a pair of guide parts formed so as to protrude downwardly at positions whereat the pair of guide parts opposes the pair of concave parts; and
    each of the pair of guide parts has a contact surface that is curved so that a projection amount thereof increases toward a front in the conveying direction.

2. The device for supplying snap rings as set forth in claim 1, wherein each bottom of the pair of concave parts is formed so as to define an inclined surface that descends toward a front in the conveying direction and is upwardly-convexly curved.

3. The device for supplying snap rings as set forth in claim 1, wherein the oscillating member has an elongated guide part having a width that is able to enter the gap of the snap ring, the device further comprising:
    an urging member for urging the oscillating member so that the guide part protrudes from the conveying surface.

4. The device for supplying snap rings as set forth in claim 3, wherein the oscillating member is attached such that an end part of the guide part is able to be protractible and retractable with respect to the conveying surface of the conveying path in an area adjacent the projection-strip guide wall in the conveying direction.

5. The device for supplying snap rings as set forth in claim 3, wherein an end of the oscillating member is pivotally supported on the conveying base below the conveying path.

* * * * *